United States Patent
Hamperl

(10) Patent No.: US 9,065,560 B2
(45) Date of Patent: Jun. 23, 2015

(54) METHOD FOR CHECKING THE OPERATION OF A PSI5 RECEPTION UNIT IN A MOTOR VEHICLE CONTROLLER, AND CORRESPONDING PSI5 RECEPTION UNIT

(71) Applicant: Continental Automotive GmbH, Hannover (DE)

(72) Inventor: Reinhard Hamperl, Köfering (DE)

(73) Assignee: Continental Automotive GmbH (DE)

( * ) Notice: Subject to any disclaimer, the term of this patent is extended or adjusted under 35 U.S.C. 154(b) by 0 days.

(21) Appl. No.: 14/390,890

(22) PCT Filed: Jan. 29, 2013

(86) PCT No.: PCT/DE2013/100030
§ 371 (c)(1),
(2) Date: Oct. 6, 2014

(87) PCT Pub. No.: WO2013/163984
PCT Pub. Date: Nov. 7, 2013

(65) Prior Publication Data
US 2015/0078498 A1 Mar. 19, 2015

(30) Foreign Application Priority Data
May 3, 2012 (DE) .......................... 10 2012 103 868

(51) Int. Cl.
*H04B 17/00* (2006.01)
*H04L 7/00* (2006.01)
*H04B 1/3822* (2015.01)

(52) U.S. Cl.
CPC .......... *H04B 17/0085* (2013.01); *H04L 7/0079* (2013.01); *H04B 1/3822* (2013.01)

(58) Field of Classification Search
CPC ...... H04B 17/008; H04B 1/3822; H04B 3/14; H04B 17/0085; H04L 7/0079; H04L 12/40123; H04L 12/40273; G01R 25/00; H04Q 9/00; B60R 2021/01061; B60R 2021/01068; G05B 19/0423
See application file for complete search history.

(56) References Cited

U.S. PATENT DOCUMENTS

| 6,501,735 | B1 | 12/2002 | Han | |
| 2009/0292961 | A1 | 11/2009 | Thurston | |
| 2011/0296065 | A1* | 12/2011 | Daecke et al. | 710/61 |
| 2012/0269253 | A1* | 10/2012 | Daecke | 375/232 |

FOREIGN PATENT DOCUMENTS

| DE | 10112844 | 9/2002 |
| EP | 1441491 | 7/2004 |

OTHER PUBLICATIONS

German Search Report mailed Jul. 30, 2012, in related Application No. DE 10 2012 103 868.6, including partial translation.
International Search Report for PCT/DE2013/100030 mailed Jun. 25, 2013.
"PS15 Peripheral Sensor Interface Specification V1.3," Jul. 29, 2008, pp. 1-46.

* cited by examiner

*Primary Examiner* — Leon Flores
(74) *Attorney, Agent, or Firm* — RatnerPrestia

(57) ABSTRACT

A method for checking the operation of a PSI5 reception unit in a motor vehicle controller is presented, wherein the PSI5 reception unit receives signals from a connected PSI5-compliant PSI5 transmission unit, wherein a check signal transmission unit is provided and this check signal transmission unit sends a prescribed check signal to the PSI5 reception unit at prescribed check times at which no signal can be expected from the PSI5 transmission unit, in particular—together with the sending of one or more synchronization pulses to the transmission unit—the check signal transmission unit sends the check signal in this defined period.

16 Claims, 1 Drawing Sheet

METHOD FOR CHECKING THE OPERATION OF A PSI5 RECEPTION UNIT IN A MOTOR VEHICLE CONTROLLER, AND CORRESPONDING PSI5 RECEPTION UNIT

CROSS REFERENCE TO RELATED APPLICATIONS

This application is the U.S. National Phase Application of PCT International Application No. PCT/DE2013/100030, filed Jan. 29, 2013, which claims priority to German Patent Application No. 10 2012 103 868.6, filed May 3, 2012, the contents of such applications being incorporated by reference herein.

FIELD OF THE INVENTION

The invention relates to a method for checking the operation of a PSI5 reception unit in a motor vehicle controller as well as a corresponding PSI5 reception unit.

BACKGROUND OF THE INVENTION

Peripheral Serial Interface (PSI5) is a standardized interface of the PSI5 organization and is based on a two-wire line and is used to connect peripheral sensors to electronic control units in automotive electronics. PSI5 uses two wires for both power supply to the sensors and data transmission. The controller provides a supply voltage and synchronization pulses modulated on this supply voltage. By selectively omitting synchronization pulses or varying the length thereof, a few bits can be transmitted from the controller to the sensor in order to set certain operation modes there, for example. The data is transmitted from the sensor to the controller by current modulation on the supply lines. In vehicles, in order to record vehicle state variables, for example in order to sense collisions, multiple sensors are connected to motor vehicle controllers, for example a central controller for passenger protection devices. One or more sensors are operated via a common communication bus (PSI5). For safety reasons, signals are always required from two independent sensors in order to activate restraint devices. If the data from two independent sensors is received by means of a single receiver, a single error in this receiver can result in an erroneous change of both sensor signals—and can therefore result in a safety-critical malfunction.

In particular, the reception unit is not checked during the normal operating cycle. U.S. 2009/0292961 A1, which is incorporated by reference, presents an integrated circuit including a plurality of transmitters and receivers, in which the output of one transmitter is connected directly to the receiver to be tested, in order to test the operation of a receiver. However, the precondition of this is that an identical signal is transmitted from the controller to the sensor as is transmitted from the sensor to the controller, which is not the case with the PSI5.

SUMMARY OF THE INVENTION

An aspect of the invention is a method for checking the operation of a PSI5 reception unit and a correspondingly suitable reception unit.

The basic idea of the invention is that the reception unit has an internal check signal transmission unit and that this check signal transmission unit sends a prescribed check signal internally to the reception unit at prescribed check times at which no signal can be expected from the transmission unit. A particularly suitable period of time results, because the reception unit sends one or more synchronization pulses to the transmission unit and the transmission unit does not send its signals until the end of a defined period and the check signal transmission unit preferably sends the check signal in this defined period.

Therefore, in a particularly preferred embodiment, together with the synchronization pulse to the transmission unit, the reception unit can initiate the check signal transmission unit to send the check signal.

The check signal preferably includes a prescribed, i.e. a known bit sequence, and a check is carried out as to whether the reception unit is receiving and processing this correctly. In addition to checking that this is identical to the prescribed bit sequence, it is therefore also possible, for example, to check whether identifiable errors contained therein such as, for example, checksum errors or the like are identified.

In addition, the reception unit is preferably prevented from forwarding the check signal to subsequent signal processing, or said signal processing is preferably prevented from failing to identify this as a check signal. To this end, the check signal can, for example, be provided with a corresponding identifier or the forwarding can be suppressed by the control system in the reception unit.

The receiver's wiring is therefore tested cyclically in the breaks in communication. If an error is detected during the checking of the receiver, the sensor data from the receiver is identified as being defective until such time as it is possible to establish that the receiver is operating properly again.

The check is performed by supplying a known 'bit stream' instead of the bus signal, and by checking the data received. The check signal transmission unit can route the check signal via an internal connection line inside the reception unit or, alternatively, via an output to the relevant input of the reception unit.

The check is performed on a synchronous bus preferably at the same time as the bus synchronization signal, as the bus signal is not forwarded to the receiver at this time anyway. It is not relevant to the invention whether the synchronization pulse is transmitted on a common bidirectional bus data line between the transmission unit and the reception unit or whether 2 separate lines or channels are used.

This invention is suitable, for example, for connecting lateral sensors by means of a PSI5 bus and for checking the receiver every 500 µs parallel to the output of the synchronization pulse.

BRIEF DESCRIPTION OF THE DRAWINGS

The invention will be explained in more detail by means of figures and embodiment examples, wherein.

DETAILED DESCRIPTION OF THE PREFERRED EMBODIMENTS

Figure 1:
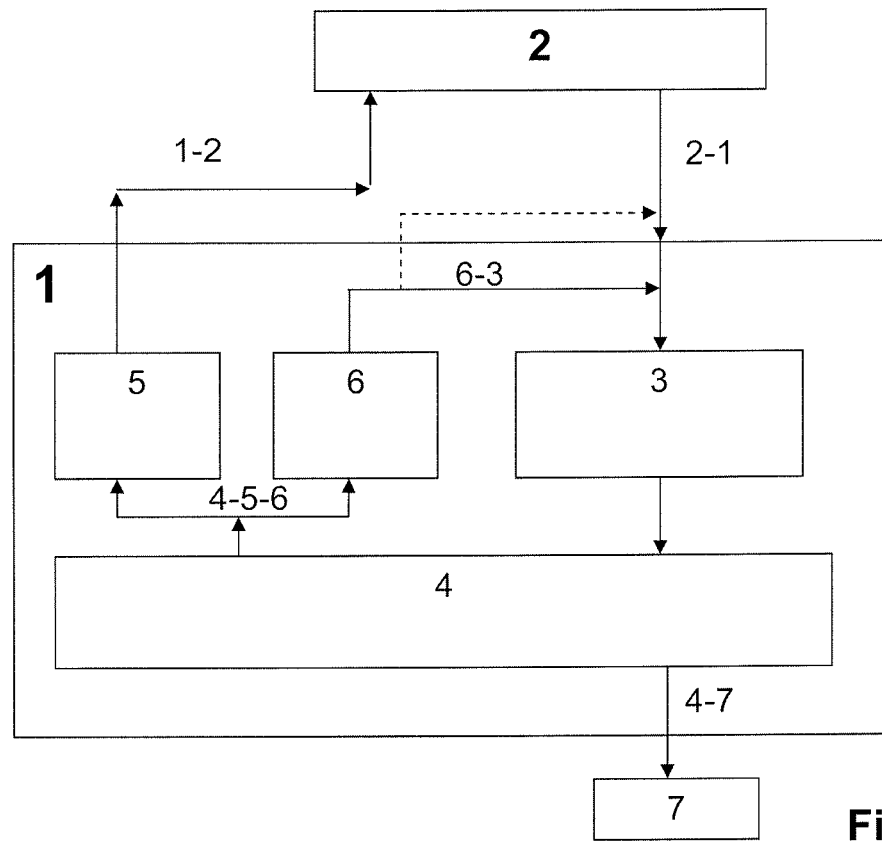
FIG. 1 shows a vehicle controller with a corresponding reception unit
Figure 2:
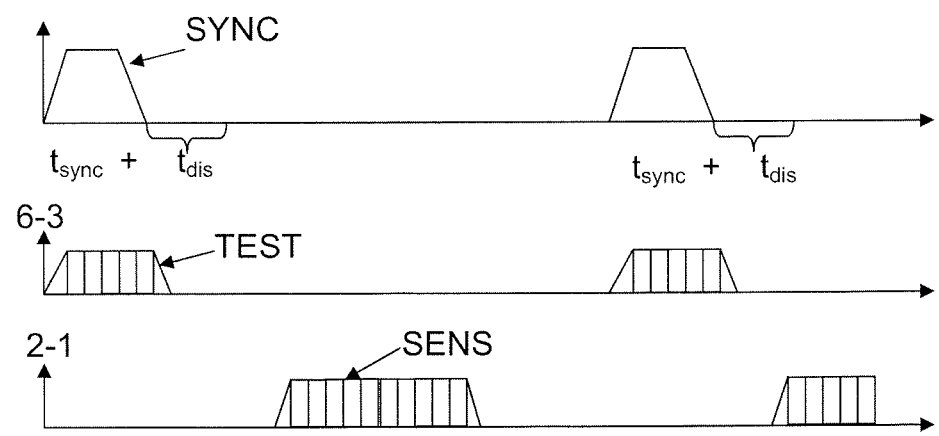
FIG. 2 shows a sketch of the timing of the method

FIG. 1 shows a motor vehicle controller having a PSI5 reception unit (1) and a PSI5 transmission unit (2), for example a sensor satellite which is located externally to the controller, wherein the invention can also be applied to internal sensors in the controller and it is irrelevant whether one or more sensors are connected to this one port of the reception unit 1. Data is therefore transmitted in accordance with the PSI5 protocol between the controller and the externally located sensor satellite.

The PSI5 transmission unit (2) preferably sends sensor signals (SENS) to the port of the PSI5 reception unit 1 cyclically. These are received and preferably also processed by the PSI5 reception unit 1, that is, for example, they are checked and converted into a different protocol and thus forwarded to signal processing 7. The PSI5 reception unit (1) has a check signal transmission unit (6) which is shown here as being located internally, but which can in principle also be located externally, wherein this check signal transmission unit (6) is configured such that the latter sends a prescribed check signal (test) to the reception unit (1) at prescribed check times at which no signal (SENS) can be expected from the PSI5 transmission unit (2).

The PSI5 reception unit (1) sends one or more synchronization pulses (SYNC) to the transmission unit (2) and the PSI5 transmission unit (2) does not send its signals until after the end of a defined period. In the case of the bidirectional bus system, this defined period is made up at least of the period $t_{sync}$ of the synchronization pulse and a discharge time $t_{dis}$, which is necessary to discharge the common wire of the effects of the synchronization pulse.

As already mentioned at the start, this break in the bus communication is offered, in order to supply the check signal to the PSI5 reception unit 1 in the meantime and to verify that the correct signal is received in the PSI5 reception unit 1. The check signal transmission unit (6) therefore sends the check signal (test) in this defined period $t_{sync}+t_{dis}$.

It is immaterial whether the check signal is routed from an internal check signal transmission unit 6 via an internal connection 6-3 to the receiver 3 of the PSI5 reception unit 1 or, as is shown, for example, by the dotted lines, via an output to the input of the reception unit 1 or even if the check signal transmission unit 6 is itself located externally. However, faults can be avoided by means of an internal arrangement and forwarding, so that an internal configuration is preferable in this respect.

For example, when triggered by the common control system 4 of the PSI5 reception unit (1)—together with the synchronization pulse (SYNC) to the PSI5 transmission unit (2), which is generated, for example, by the PSI5-compliant synchronization pulse generator 5—the check signal transmission unit (6) can be initiated to send the check signal (test), i.e. the internal signal via line 4-5-6 guarantees the synchronization pulse (SYNC) on line 1-2 on the one hand, and the check signal (TEST) on the other hand.

Therefore, the PSI5 reception unit 1 still has sufficient time to process the check signal internally and to have a check carried out, for example, by the control system 4 as to whether the check signal has been received correctly, whether all of the error check routines have been conducted properly and whether any errors intentionally stored in the check signal have been identified and it is also guaranteed that the check signal (test) is not forwarded to subsequent signal processing (7).

Alternatively, it is conceivable that signal processing (7) identifies the check signal (test) by means of an identifier or the like as a check signal, and therefore does not confuse it, for instance, with a sensor signal or take account of it in signal processing. If an error is detected during the checking of the receiver (3), the sensor data from the receiver is identified as being defective until such time as it is possible to establish that the receiver is operating properly again.

The invention claimed is:

1. A method for checking the operation of a peripheral serial interface (PSI5) reception unit in a motor vehicle controller, the method including:

receiving, by the PSI5 reception unit, sensor signals (SENS) from a connected PSI5 transmission unit, transmitting, by the PSI5 reception unit, synchronization pulses (SYNC) to the PSI5 transmission unit, transmitting, by a check signal transmission unit of the PSI5 reception unit, a prescribed check signal (test) to a receiver of the PSI5 reception unit at prescribed check times determined by the transmitted synchronization pulses during which no sensor signal (SENS) can be expected from the PSI5 transmission unit.

2. The method according to claim 1, wherein the reception unit sends one or more synchronization pulses (SYNC) to the transmission unit and the transmission unit does not send its signals until after the end of a defined period and the check signal transmission unit sends the check signal (test) in this defined period.

3. The method according to claim 2, wherein together with the synchronization pulse (SYNC) to the transmission unit, the reception unit initiates the check signal transmission unit to send the check signal (test).

4. The method according to claim 1, wherein the check signal (test) contains a prescribed bit sequence and a check is carried out as to whether the reception unit is receiving and processing the test signal correctly.

5. The method according to claim 1, wherein the reception unit does not forward the check signal (test) to subsequent signal processing or identifies this signal processing as a check signal (test).

6. A motor vehicle controller including:
a peripheral serial interface (PSI5) reception unit including:
a first port for connecting to a PSI5-compliant transmission unit and for receiving signals (SENS) from the PSI5-compliant transmission unit,
a second port for connecting to the PSI5-compliant transmission unit and for transmitting synchronization pulses (SYNC) to the PSI5-compliant transmission unit, and
a check signal transmission unit is configured to transmit a prescribed check signal (test) to a receiver of the PSI5 reception unit at prescribed check times determined by the transmitted synchronization pulses during which no sensor signal (SENS) can be expected from the PSI5-compliant transmission unit.

7. The motor vehicle controller according to claim 6, wherein the PSI5 reception unit is configured such that the latter sends one or more synchronization pulses to the PSI5 transmission unit, wherein the PSI5 transmission unit does not send signals (SENS) until after the end of a defined period and the check signal transmission unit sends the check signal in this defined period.

8. The motor vehicle controller according to claim 6, wherein the reception unit is configured such that, together with the synchronization pulse to the transmission unit, the check signal transmission unit is initiated to send the check signal (test).

9. The motor vehicle controller according to claim 6, wherein the check signal transmission unit differs from the synchronization pulse generator.

10. A PSI5 reception unit for a motor vehicle controller according to claim 6, wherein the PSI5 reception unit comprises an internal check signal transmission unit.

11. The motor vehicle controller according to claim 7, wherein the reception unit is configured such that, together with the synchronization pulse to the transmission unit, the check signal transmission unit is initiated to send the check signal (test).

12. The motor vehicle controller according to claim 7, wherein the check signal transmission unit differs from the synchronization pulse generator.

13. The motor vehicle controller according to claim 8, wherein the check signal transmission unit differs from the synchronization pulse generator.

14. A PSI5 reception unit for a motor vehicle controller according to claim 7, wherein the PSI5 reception unit comprises an internal check signal transmission unit.

15. A PSI5 reception unit for a motor vehicle controller according to claim 8, wherein the PSI5 reception unit comprises an internal check signal transmission unit.

16. A PSI5 reception unit for a motor vehicle controller according to claim 9, wherein the PSI5 reception unit comprises an internal check signal transmission unit.

\* \* \* \* \*